United States Patent Office 3,533,999
Patented Oct. 13, 1970

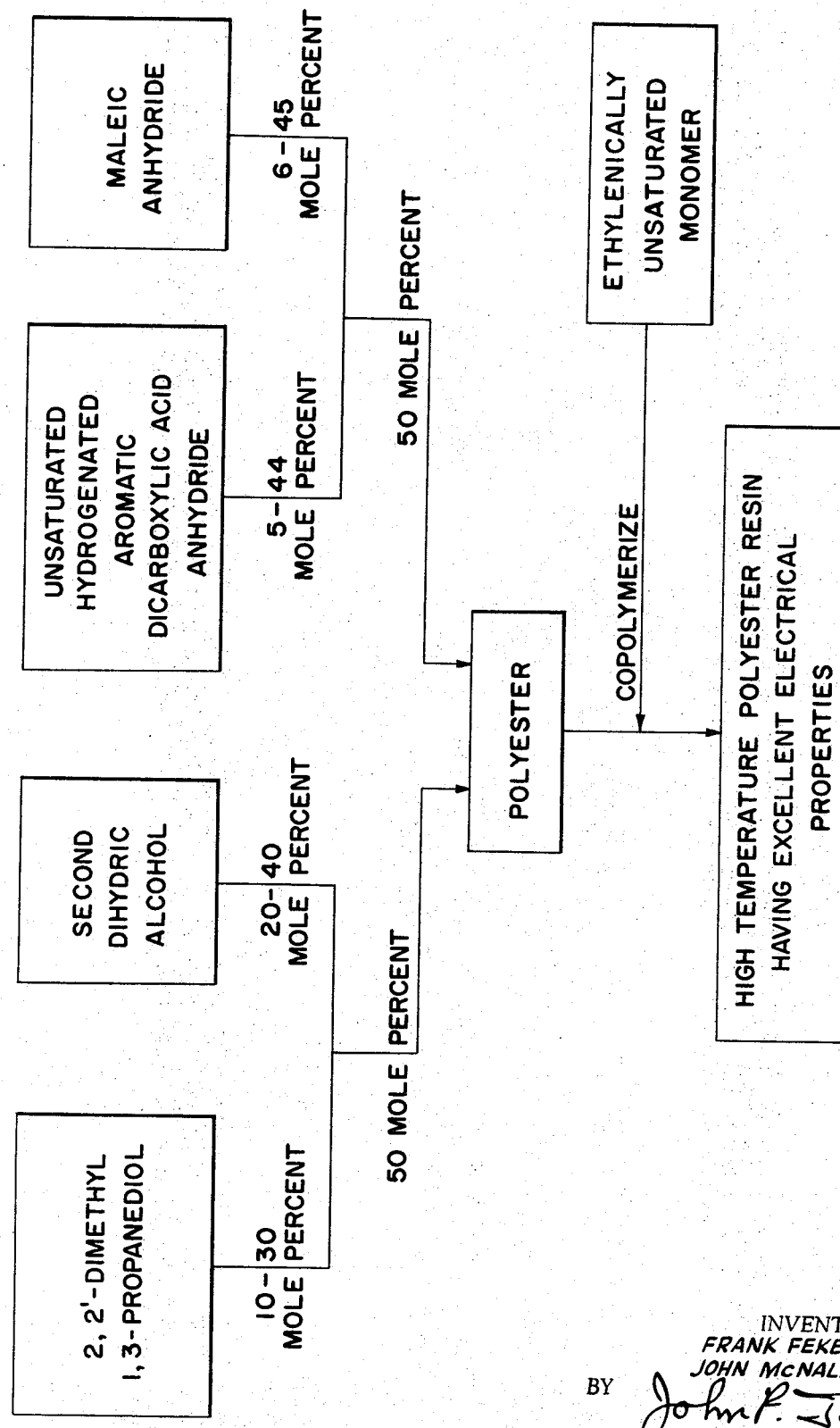

3,533,999
HIGH TEMPERATURE UNSATURATED POLY-ESTER INCLUDING NEOPENTYL GLYCOL AND TETRAHYDROPHTHALIC ACID
Frank Fekete, Monroeville, and John S. McNally, Arnold, Pa., assignors to Koppers Company, Inc., a corporation of Delaware
Filed June 5, 1967, Ser. No. 643,464
Int. Cl. C08f *17/12, 21/02*
U.S. Cl. 260—75          6 Claims

ABSTRACT OF THE DISCLOSURE

An unsaturated polyester having good electrical and high temperature properties when copolymerized with a monomer such as styrene is formed by reacting 2,2-dimethyl 1,3-propanediol (neopentyl glycol) and a second dihydric alcohol such as ethylene glycol or propylene glycol with maleic anhydride and an unsaturated hydrogenated aromatic dicarboxylic acid anhydride such as tetrahydrophthalic anhydride. The copolymerized polyester resin is useful in electrical applications as a replacement for wood, ceramics, and rubber materials or the like.

BACKGROUND OF THE INVENTION

The electrical industry, due to current trends and changes in technology, has become an increasingly attractive market for plastic materials as replacements for conventional materials made of wood, ceramics, rubber and the like. For economic reasons, unsaturated polyesters (due to the large amounts of relatively inexpensive crosslinking monomers such as styrene used therein) appear to be the most desirable general purpose plastic materials for such markets. However, to effectively compete with presently used materials, the polyester must have good high temperature properties as well as good electrical and mechanical properties.

Unsaturated polyesters made with 2,2-dimethyl 1,3-propanediol (neopentyl glycol) are known to possess superior electrical properties. However, the various conventional formulations heretofore made with maleic and phthalic anhydrides have produced unsaturated polyesters which have been unsatisfactory for high temperature electrical applications due to either low heat distortion values or low thermal stability. (Thermal stability reflects the amount of weight loss of the cured polyester resin when exposed to high temperatures for extended periods of time.)

Also, as mentioned above, the particular polyester formulation should be capable of dissolving in any ethylenically unsaturated copolymerizable monomer such as with which the polyester may then be cured by the later addition of a free radical generating catalyst to cause crosslinking between the polyester and the monomer.

SUMMARY OF THE INVENTION

Quite suprisingly, it has now been discovered that the combination of 2,2-dimethyl 1,3-propanediol and a second dihydric alcohol, such as ethylene glycol, polyesterified with a combination of maleic anhydride and an unsaturated hydrogenated aromatic dicarboxylic anhydride, such as tetrahydrophthalic anhydride results in a polyester which, when crosslinked with an ethylenically unsaturated monomer such as styrene, has high thermal resistance, high heat distortion values, and good electrical properties, as well as good mechanical and chemical properties, without sacrificing monomer compatibility.

In accordance with the invention, a polyester composition, soluble in an ethylenically unsaturated monomer, and which, when copolymerized with the monomer, is characterized by excellent high temperature and electrical properties, is formed by the esterification of dihydric alcohols and unsaturated dicarboxylic acid anhydrides.

(a) The dihydric alcohols consisting essentially of:
(1) 10–30 mole percent 2,2-dimethyl 1,3-propanediol,
(2) 20–40 mole percent of a second dihydric alcohol having the formula:

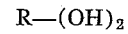

where R is an alkylene having from 2–6 carbon atoms, hydrogenated phenylene, hydrogenated biphenylene, or a hydrogenated bis-phenol of the following formula:

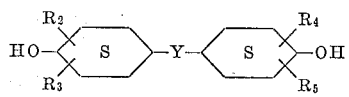

where $R_2$, $R_3$, $R_4$, $R_5$ are the same or different and are selected from the group consisting of hydrogen or lower alkyl, and Y is a lower alkylene;

the sum of the total mole percent of the dihydric alcohols being at least 50 mole percent of the total moles of dihydric alcohols and dicarboxylic acid anhydrides; and (b) The unsaturated dicarboxylic acid anhydrides consisting essentially of:
(1) 5–44 mole percent of an unsaturated, hydrogenated aromatic dicarboxylic acid anhydride; and
(2) 6–45 mole percent of maleic anhydride, the sum of the total mole percent of the dicarboxylic acid anhydrides in the polyester being 50 mole percent of the total moles of dihydric alcohols and dicarboxylic acid anhydrides, the sum of the mole percent of 2,2-dimethyl 1,3-propanediol and the unsaturated hydrogenated aromatic dicarboxylic acid anhydride constituting at least 20 mole percent of the polyester.

DESCRIPTION OF THE DRAWING

The drawing is a flow-sheet which illustrates schematically the invention which is described in detail below.

DETAILED DESCRIPTION

The polyester of the invention is made by reacting equimolar amounts of dihydric alcohols and dicarboxylic acids or their anhydrides. The esterification reaction between a carboxylic acid and an alcohol to form an ester is given by the equation below:

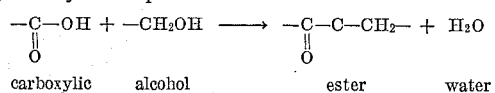

When difunctional molecules are used, i.e. dicarboxylic acids and dihydric alcohols, the ester will also have an hydroxyl end group and a carboxylic acid end group as illustrated below:

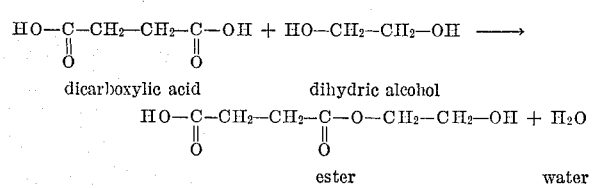

Each of these end groups are then available to repeat the esterification reaction illustrated above by reacting with more acid and more alcohol respectively. If all the acids and alcohols used as reactants be difunctional, the polyester molecule chains can be built to great length. However, the reaction is reversible and hence, the water formed must be removed. This is one of several practical limitations as to the size of the polyester molecule.

Another important consideration as to high molecular weight is the ratio of amounts of acid and alcohol used. If a large excess of either acid or alcohol is used, the growth of the polyester molecule may be inhibited, since the formation of the ester linkages is dependent upon the reaction of one acid group with one alcohol group. Therefore, the mole ratio of the dicarboxylic acids or their anhydrides to the dihydric alcohols in the polyester must be about one to one. However, due to loss of some dihydric alcohol from the reactor by boiling off with the by-product water, which as mentioned earlier, must be removed to allow the esterification reaction to proceed, about 10% by weight excess dihydric alcohol is usually charged to the reactor. The exact amount of excess dihydric alcohol used will depend somewhat upon the boiling points of the particular dihydric alcohols used. When a higher boiling dihydric alcohol is used as the second dihydric alcohol, for example 1,4-butanediol, B.P. 230° C., losses of dihydric alcohol during the esterification are less and the need for excess amounts is reduced. It should be noted that 2,2-dimethyl 1,3-propanediol has a boiling point of 203° C. Therefore, dihydric alcohol losses and resultant need for excess dihydric alcohol during the esterification (which is carried on at temperatures generally in the range of 200–215° C. or below) are somewhat dependent upon the boiling point of the second dihydric alcohol.

The 2,2-dimethyl 1,3-propanediol in amounts of at least 10% of the total mole content of the polyester of the invention results in a polyester having excellent high temperature properties when cured with a cross-linking monomer such as styrene. However, when amounts above 30% of the total mole content of the polyester are used, the compatibility of the polyester with monomers such as styrene, which are used as solvents and cross-linking monomers for the polyester, is reduced.

The second dihydric alcohol has the general formula: $R(OH)_2$ where R is alkylene having from 2–6 carbon atoms, hydrogenated phenylene, hydrogenated biphenylene, or a hydrogenated bisphenol of the following formula:

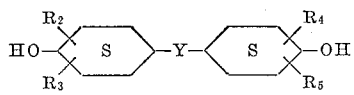

where $R_1$, $R_2$, $R_3$, $R_4$, are the same or different and are selected from the class consisting of hydrogen or lower alkyl, and Y is a lower alkylene. Examples of such dihydric alcohols include ethylene glycol, 1,2-propanediol, 1,3-butanediol, 1,4-butanediol, 2,3-butanediol, 1,3-cyclohexanediol, hydrogenated 2,2 - bis(4 - hydroxyphenylene) propane, hydrogenated 2,2-bis(4 - hydroxy-3,5-dimethylphenylene) propane and the like.

The amount of the second dihydric alcohol used in forming the polyester of the invention is from 20–40 mole percent. These limits are based on the amount of 2,2-dimethyl 1,3-propanediol used since the total sum of all dihydric alcohols must equal at least 50 mole percent of the polyester (a slight excess of the dihydric alcohol is sometimes employed to compensate for losses as mentioned above).

The unsaturated, hydrogenated aromatic dicarboxylic acid anhydride comprises a dicarboxylic acid anhydride having an aromatic backbone which has been partially hydrogenated leaving one double bond in the ring. Examples of such dicarboxylic acid anhydrides include tetrahydrophthalic anhydride, endo-cis-bicyclo (2.2.1)-5-heptene-2,3-dicarboxylic acid anhydride having the formula:

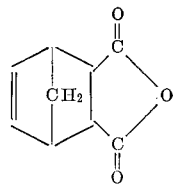

and alkyl substituted endo-cis-bicyclo (2.2.1)-5-heptene-2,3-dicarboxylic acid anhydrides having the formua:

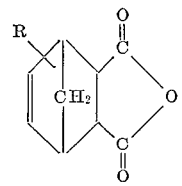

where R is lower alkyl.

In accordance with the invention, the unsaturated hydrogenated aromatic dicarboxylic acid anhydride is used in amounts ranging from 5–44 mole percent of the polyester. The limitations placed upon the amount of this anhydride in the polyester of the invention are keyed to the high temperature properties desired as well as the cure time. As the amount of 2,2-dimethyl 1,3-propanediol is decreased in the formulation, the amount of the unsaturated, hydrogenated, aromatic dicarboxylic acid anhydride must be increased to maintain the high temperature properties. It has been found that the sum of the total mole percent of 2,2-dimethyl 1,3-propanediol and unsaturated hydrogenated aromatic dicarboxylic acid anhydride must be at least 20 mole percent to obtain such properties. However, the increasing of the amount of this anhydride and resulting reduction of the amount of maleic anhydride in the formulation results in lengthened curing times since the maleic double bond is much more reactive than that of the unsaturated, hydrogenated aromatic dicarboxylic acid anhydride. Thus, the use of lesser amounts of maleic anhydride, unless the cure time be extended, can result in less crosslinking and resulting reduction in hardness of the cured polyester resin. The maximum limitation on the amount of this anhydride useable in the polyester reflects the minimum satisfactory hardness of the polyester. Polyesters formulated with more than 44 mole percent of the unsaturated, hydrogenated aromatic dicarboxylic acid anhydride are too soft for high temperature applications.

The fourth component in the polyester is maleic anhydride. The term maleic anhydride is intended herein to embrace its isomeric counterpart fumaric acid and the use of the term anhydride as used throughout the description is intended to embrace both the acid and anhydride states of those dicarboxylic acids which can have anhydride states. In accordance with the invention, the maleic anhydride is present in a minimum amount of 6 mole percent to insure a minimum degree of hardness to the polyester as discussed above. The maximum amount of maleic anhydride useable is 45 mole percent of the total moles in the polyester. The amount, within these ranges, used is dependent upon the amount of unsaturated, hydrogenated, aromatic dicarboxylic acid anhydride present. The sum of the total moles of all the anhydrides in the polyester is 50 mole percent of the total moles in the polyester.

The polyester may be prepared in the presence of gelation inhibitors such as hydroquinone or the like, such as are well known in the art. Likewise, esterification catalysts well known in the art may also be used in the esterification.

The esterification is carried out under an inert blanket of gas such as nitrogen. The esterification is carried out in a temperature range of 180–220° C. for a period of about 6–20 hours until an acid number below 100 and preferably below 50 is obtained (based on milliequivalents of KOH necessary to neutralize 1 gram of the polyester).

The resulting polyester may be dissolved in and subsequently copolymerized with any of the well-known ethylenically unsaturated monomers used as solvents and copolymerizable monomers for polyesters. Examples of such monomers include styrene, alpha-methyl styrene, vinyl toluene, divinyl benzene, chlorostyrene, and the like as well as mixtures of the above monomers. The use of the term polyester herein is defined as the esterification product of dihydric alcohols and dicarboxylic acids or their anhydrides, while the term polyester resin is defined as a polyester dissolved in, or cross-linked with, a monomer such as described above.

The following examples will serve to further illustrate the invention.

EXAMPLE I

To a nitrogen-purged reactor was charged 2 moles of 2,2-dimethyl 1,3-propanediol (neopentyl glycol), 2.2 moles of ethylene glycol, 1 mole of tetrahydrophthalic anhydride, and 3 moles of maleic anhydride. 200 p.p.m. of hydroquinone were added as a gelation inhibitor. The temperature of the reaction vessel was then raised to 190° C. and then maintained at 190–200° C. for 16 hours until the polyester reached an acid number of 22.

Weighed amounts of the polyester were added to sufficient amounts of liquid monomers of styrene and vinyl toluene respectively to provide solutions containing 40% by weight monomer, 60% by weight polyester, and solutions containing 55% by weight monomer and 45% by weight polyester.

Castings were prepared from the solutions by adding ¾ percent by weight benzoyl peroxide catalyst to the styrene solutions and ¾ percent by weight 2,5-dimethyl hexane 2,5-diperoctoate catalyst to the vinyl toluene solutions. The styrene castings were then cured for 2 hours at 75° C. and then 2 hours at 135° C. while the vinyl toluene castings were cured for 2 hours at 60° C. followed by 1 hour at 75° C. and then 2 hours at 135° C. The cured castings were then tested to determine various physical properties including their high temperature properties (heat distortion temperatures and percent weight loss at 220° C. for 8 days). The results are tabulated below:

TABLE I

| | 40% styrene | 55% styrene | 40% vinyl toluene | 55% vinyl toluene |
|---|---|---|---|---|
| Izod impact | 0.79 | 0.89 | 0.71 | 0.82 |
| Tensile Strength | 6–8,000 | 5–7,000 | 6–8,000 | 5–7,000 |
| Flexural Strength | 15–17,000 | 13–15,000 | 15–17,000 | 13–15,000 |
| Heat Distortion Temp., °F | 260 | 273 | 265 | 250 |
| Percent H₂O Absorption, 24 hours room temp | 0.29 | 0.23 | 0.23 | 0.19 |
| Thermal resistance, percent Weight Loss | 4.1 | 4.7 | 1.7 | 1.7 |

EXAMPLE II

The polyester of the invention was further tested to illustrate the electrical properties of the polyester by subjecting the 40% vinyl toluene castings obtained in Example I to various ASTM electrical tests. The various tests and the results obtained in each test are tabulated below:

TABLE II

| ASTM test | Property | Measurement |
|---|---|---|
| D257 | Volume resistivity | .671×10¹⁶ ohm-cm. |
| D257 | Surface resistivity | .269×10¹⁶ ohms. |
| D257 | Insulation resistance | 1.25×10¹⁴ ohms. |
| D150 | Dissipation factor (at 1KC) | .0071. |
| D150 | Power factor (at 1KC) | 0.6%. |
| D150 | Dielectric constant (at 1KC) | 3.57. |
| D495 | Arc resistance | 93.1 seconds. |
| D2303 | Track resistance | >1,400 minutes. |
| D149 | Dielectric strength (per pendicular) | 471–475 volts per mil thickness. |
| D229 | Dielectric strength (surface) | 56.1–57.2 kilovolts. |

The above ASTM test results indicate that the polyester resin of the invention possesses electrical properties comparable to conventional resins such as epoxies as well as good high temperature properties; yet the polyester resins of the invention may be economically produced due to the large weight percent of the inexpensive ethylenically unsaturated monomer copolymerized with the polyesters.

What is claimed is:

1. A polyester composition, having an acid number below 100, soluble in an ethylenically unsaturated monomer, which when copolymerized with the monomer, is characterized by excellent high temperature and electrical properties formed by the esterification of dihydric alcohols and unsaturated dicarboxylic acid anhydrides:
   (a) the dihydric alcohols consisting essentially of:
      (1) 10 to 30 mole percent 2,2-dimethyl 1,3-propanediol:
      (2) 20 to 40 mole percent of a second dihydric alcohol having the formula:

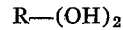

where R is an alkylene having from 2–6 carbon atoms, hydrogenated phenylene, hydrogenated biphenylene, or a hydrogenated bis-phenol of the following formula:

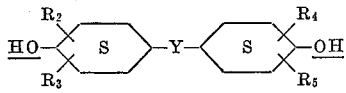

where R₂, R₃, R₄, R₅, are the same or different and are selected from the group consisting of hydrogen or lower alkyl, and Y is a lower alkylene;
   the sum of the total mole percent of the dihydric alcohols being at least 50 mole percent of the total moles of dihydric alcohols and dicarboxylic acid anhydrides; and
   (b) the unsaturated dicarboxylic acid anhydrides consisting essentially of:
      (1) 5–44 mole percent of an unsaturated, dicarboxylic acid anhydride selected from the group consisting of tetrahydrophthalic anhydride and endocis - bicyclo(2.2.1)-5-heptene-2,3-dicarboxylic acid anhydride; and
      (2) 6–45 mole percent of maleic anhydride, the sum of the total mole percent of the dicarboxylic acid anhydrides in the polyester being 50 mole percent of the total moles of hihydric alcohols and dicarboxylic acid anhydrides;
   the sum of the mole percent of 2,2-dimethyl-1,3-propanediol and the unsaturated dicarboxylic acid anhydride constituting at least 20 mole percent of the polyester.

2. The polyester composition of claim 1 wherein said second dihydric alcohol is selected from the class consisting of ethylene glycol and 1,2-propanediol.

3. The polyester composition of claim 1 wherein said second dihydric alcohol is ethylene glycol.

4. The polyester composition of claim 1 wherein said unsaturated, dicarboxylic acid anhydride is tetrahydrophthalic anhydride.

5. The polyester composition of claim 1 wherein said second dihydric alcohol is ethylene glycol and said unsaturated dicarboxylic acid anhydride is tetrahydrophthalic anhydride.

6. A polyester composition soluble in an ethylenically unsaturated monomer, which when copolymerized with the monomer, is characterized by excellent high temperature and electrical properties formed by esterifying:
   (a) 10–30 mole percent 2,2-dimethyl 1,3-propanediol;
   (b) 20–40 mole percent ethylene glycol with
   (c) 5–44 mole percent tetrahydrophthalic anhydride; and
   (d) 6–45 mole percent maleic anhydride, for a period of 6–20 hours at a temperature of 180–220° C. in an inert atmosphere until the polyester reaches an acid number below 100, the sum of the moles of the dihydric alcohols being at least 50 percent of the total moles within the polyester and the sum of the moles of 2,2-dimethyl 1,3-propanediol, the tetrahydrophthalic anhydride being at least 20 mole percent of the total moles within the polyester, and the sum of the total mole percent of the dicarboxylic acid anhydrides in the polyester being 50 mole percent of the total moles of dihydric alcohols and dicarboxylic acid anhydrides.

References Cited

UNITED STATES PATENTS

| | | | |
|---|---|---|---|
| 2,421,876 | 6/1947 | Gerhart | 260—42 |
| 2,479,486 | 8/1949 | Gerhart | 260—45.4 |
| 3,275,710 | 9/1966 | Wooster et al. | 260—863 |
| 3,435,094 | 3/1969 | Parker | 260—872 |

WILLIAM H. SHORT, Primary Examiner

M. GOLDSTEIN, Assistant Examiner

U.S. Cl. X.R.

260—861, 871

PO-1050
(5/69)

UNITED STATES PATENT OFFICE
CERTIFICATE OF CORRECTION

Patent No. 3,533,999  Dated October 13, 1970

Inventor(s) FRANK FEKETE and JOHN S. MCNALLY

It is certified that error appears in the above-identified patent and that said Letters Patent are hereby corrected as shown below:

In Claim 1, line 41, delete "hihydric" and insert the word --dihydric--.

Signed and Sealed
JAN 12 1971

(SEAL)
Attest:

Edward M. Fletcher, Jr.
Attesting Officer

WILLIAM E. SCHUYLER, JR.
Commissioner of Patents